United States Patent [19]

Oiwa

[11] Patent Number: 5,174,273
[45] Date of Patent: Dec. 29, 1992

[54] COOKING DEVICE
[75] Inventor: Masatoshi Oiwa, Nagoya, Japan
[73] Assignee: Meito Corporation, Aichi, Japan
[21] Appl. No.: 804,644
[22] Filed: Dec. 10, 1991
[51] Int. Cl.$^5$ .......................... A47J 27/10
[52] U.S. Cl. ....................... 126/377; 126/345; 99/403
[58] Field of Search ............ 126/345, 346, 347, 348, 126/369, 369.2, 369.3, 391, 392, 350 C, 350 R, 377, 378, 379, 376, 373; 99/403, 416, 417, 418

[56] References Cited

U.S. PATENT DOCUMENTS

| 74,419 | 2/1868 | O'Poole | 126/369.3 |
| 837,884 | 12/1906 | Ragan | 126/346 |
| 2,021,465 | 11/1935 | Ritscher | 99/403 |

FOREIGN PATENT DOCUMENTS

| 98397 | 9/1897 | Fed. Rep. of Germany | 126/347 |
| 212714 | 8/1909 | Fed. Rep. of Germany | 126/345 |
| 807354 | 1/1959 | United Kingdom | 99/403 |

Primary Examiner—Carl D. Price
Attorney, Agent, or Firm—Nikaido, Marmelstein, Murray & Oram

[57] ABSTRACT

This invention relates to a cooking device which cooks food evenly without making the food get out of shape, and also keeps the cooked food hot. The device has a hot water tank having a bottom inner tank provided in the bottom thereof and a bottom outer tank for surrounding the bottom inner tank through a flue. A combustion chamber is provided under the hot water tank. A guide partition plate is arranged at a gradient in the hot water tank and has a passage for passing hot water upward to its upstream side. A circulating unit is formed at a downstream side. A partition unit collects the hot water rising from the bottom of the hot water tank to guide the hot water to the passage side. A partition plate has a through hole and is provided to partition the hot water tank above the guide partition plate into a boiling chamber, located above the passage, and a heat insulation chamber, located above the partition unit.

9 Claims, 2 Drawing Sheets

COOKING DEVICE

BACKGROUND OF THE INVENTION

1. Field of the Invention

This invention relates to a cooking device which is capable of cooking food evenly without making the food get out of shape, and also capable of keeping the cooked food hot.

2. Description of the Prior Art

A cooking caldron for business use generally takes the shape of a container with top opening. The bottom of the caldron is heated with water inside. When the water is heated enough, a large quantity of food is dumped into the hot water for cooking.

However, when using such a conventional cooking caldron, sometimes food is not evenly cooked since the water temperature at the bottom of the caldron, which is close to a burner or other heat source, would be higher than that at the upper opening area. Such a temperature difference causes uneven cooking of the food and also caused the cooked food to get out of shape.

SUMMARY OF THE INVENTION

Accordingly, an object of this invention is to provide a cooking device which eliminates the above-described problem preventing uneven cooking of food, keeping the cooked food in shape and further keeping properly cooked food hot.

In order to achieve this and other objects, there is provided according to this invention a cooking device which has a hot water tank having a bottom inner tank provided in the bottom thereof and a bottom outer tank for surrounding the bottom inner tank through a flue. A combustion chamber is provided under the hot water tank. A guide partition plate is arranged at a gradient in the hot water tank and has a passage for passing hot water upward to its upstream side. A circulating unit is formed at a downstream side. A partition unit collects the hot water rising from the bottom of the hot water tank to guide the hot water to the passage side. A partition plate, having a through hole, is provided to partition the hot water tank above the guide partition plate into a boiling chamber, located above the passage, and a heat insulation chamber, located above the partition unit.

According to this invention, the hot water heated in the bottom inner tank rises, is collected by the guide partition plate, and is guided to the passage side.

The guided hot water is fed though the passage to the upper boiling chamber, and further introduced via the through hole of the partition plate into the heat insulation chamber. The hot water is then circulated through the circulating unit to the bottom of the hot water tank.

The cooking device of this invention, arranged as described above, arranges the guide partition plate at a gradient in the hot water tank. A partition plate partitions the hot water tank above the guide partition plate into a boiling chamber and a heat insulation chamber. The guide partition plate collects the hot water stream to supply the hot water into the boiling chamber, and then fed it to the heat insulation chamber. Therefore, high temperature hot water is always passed through the boiling chamber to cook or boil the food at a uniform temperature. Since the space of the boiling chamber is defined by the guide partition plate and the partition plate, the food is moved less at the time of heating to uniformly heat the food and to cook food evenly without making the food get out of shape. Since the food is separated from a heat source such as a main burner, etc., the food is not scorched.

Further, the cooked or boiled-up food is held in the heat insulation chamber to heat insulate the cooked food and to immerse the food with taste, thereby reducing the amount of seasonings used.

Further, since the bottom inner and outer tanks are formed in the bottom of the hot water tank and the inner and outer flues are provided therebetween to be heated, the heat exchanging area can be increased to obtain high thermal efficiency. Since exhausting temperature can be lowered to 90°-110° C. as compared with 250°-300° C. of a conventional unit, this invention can provide an effect of easily treating exhaust gas.

DESCRIPTION OF THE PREFERRED EMBODIMENT

Figure 1:
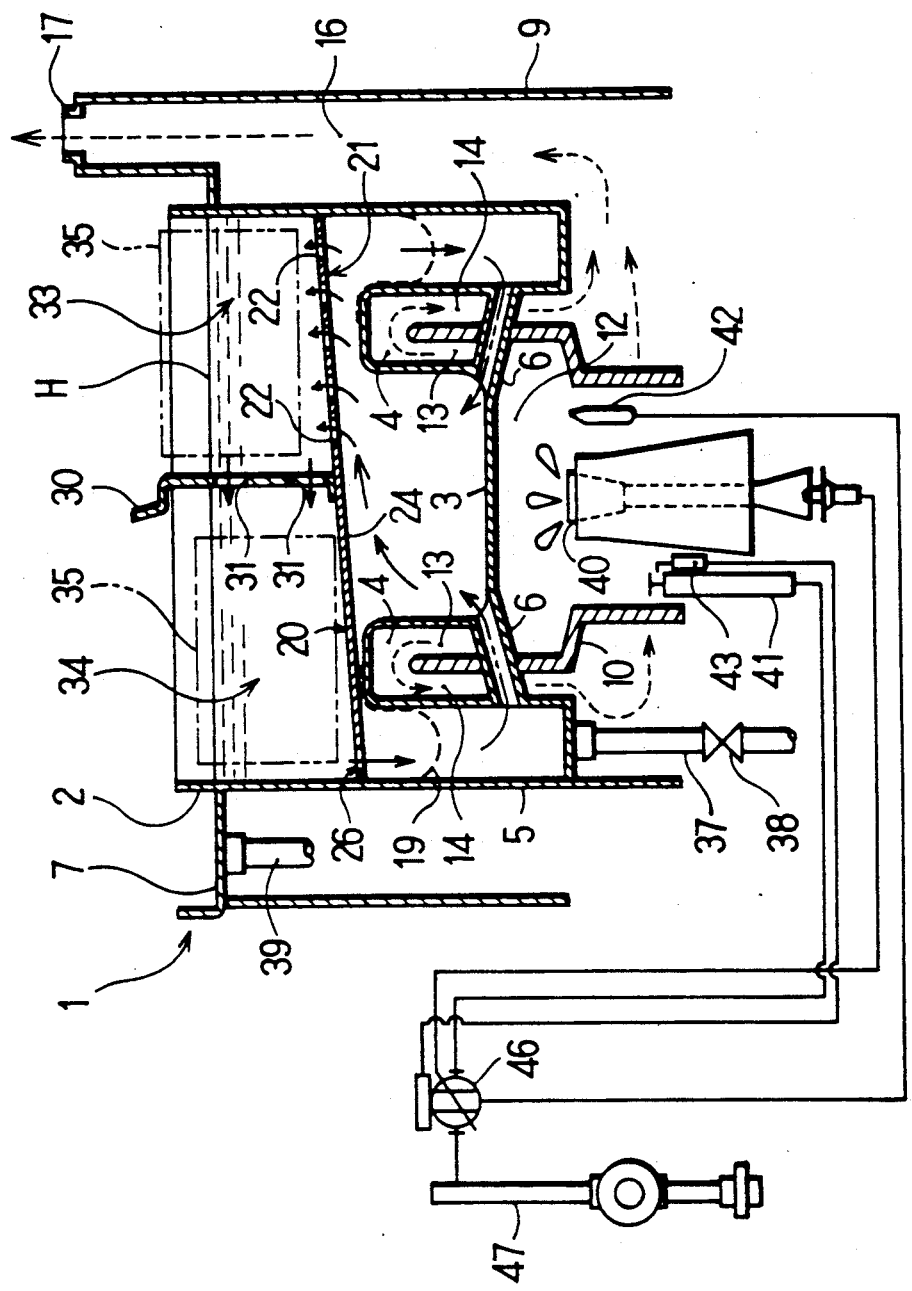
FIG. 1 is a sectional view of an arrangement of an embodiment of a cooking oven of this invention.
Figure 2:
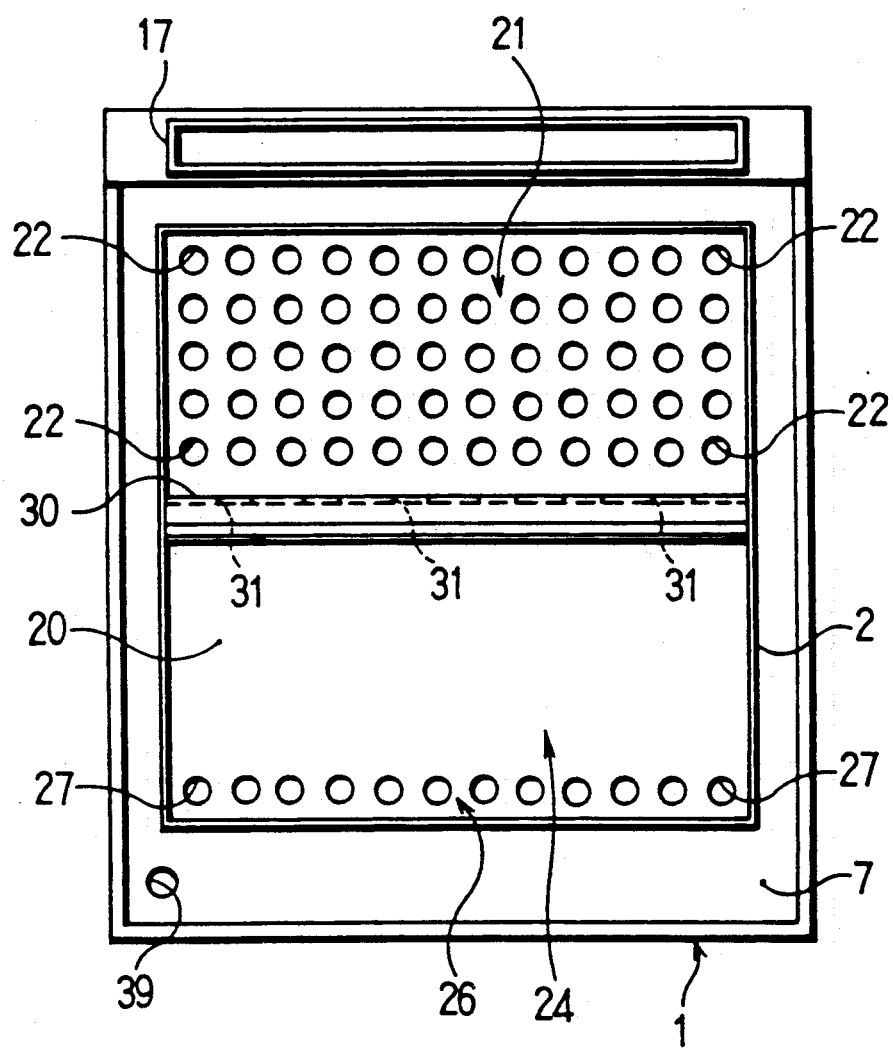
FIG. 2 is a plan view of the embodiment.

An embodiment of this invention will now be described with reference to FIGS. 1 and 2.

A cooking caldron 1 mainly comprises a bottom inner tank 3, a hot water tank 2 having a bottom outer tank 5, a combustion chamber 12 provided under the hot water tank 2, a guide partition plate 20 having a passage 21 at an upstream side, a circulation unit 26 at a downstream side, a partition unit 24 arranged at a gradient in the hot water tank 2, and a partition plate 30 having a through hole 31 and partitioning the guide partition plate 20 into a boiling chamber 33 and a heat insulation chamber 34.

The hot water tank 2 is formed, in the embodiment, in a rectangular parallelepiped shape in profile, and with the circular bottom inner tank 3 protruding at the center of the bottom downward. The outer tank 5 of a rectangular parallelepiped shape protruding through a flue 4 is formed to surround the outer periphery of the inner tank 3 and is formed on the outer periphery of the inner tank 3. The lower portion of the outer tank 5 is connected to the lower portion of the inner tank 3 via a plurality of connection tubes 6. A ceiling plate 7 is provided at the outer upper periphery of the hot water tank 2. A heat insulation wall 9 is provided under the ceiling plate 7 so as to surround the side and lower portions of the hot water tank 2 and to form a flue 16 to the hot water tank 2. An exhaust cylinder 17, for exhausting gas, is provided at a predetermined position of the heat insulation wall 9.

A stepped cylindrical combustion cylinder 10, surrounding the inner tank 3 at a predetermined interval is arranged in the flue 4. The combustion cylinder 10 is formed of zirconia ceramic which can radiate a far infrared ray when the cylinder 10 is heated. A combustion chamber 12 is formed between the cylinder 10 and the bottom of the inner tank 3. An inner flue 13 is formed between the combustion cylinder 10 and the sidewall of the inner tank 3. An outer flue 14, connected to the inner flue 13, is formed between the combustion cylinder 10 and the outer tank 5. The flue 14 is, in turn, connected to the flue 16.

The guide partition plate 20 is formed in a flat shape with a hole perforated of zirconia ceramic capable of radiating a far infrared ray, and arranged at a predetermined gradient above the inner and outer tanks 3, 5 in the hot water tank 2. The guide partition plate 20 is formed with a passage 21 made of a number of pores 22 at predetermined positions of an upstream side and with a circulation unit 26 made of a number of pores 27 perforated in one row along the edge side of a downstream side. A flat plate-shaped partition unit 24 is formed between the passage 21 and the circulating unit 26.

The partition plate 30 is formed in a different U-shaped section and perforated with a plurality of through holes 31 at predetermined positions. The partition plate 30 is arranged movably upwardly or downwardly of the gradient on the guide partition plate 20. The portion above the guide partition plate 20 in the hot water tank 2 is divided by the partition plate 30 into a boiling chamber 33, located above the passage 21, and a heat insulation chamber 34, located above the partition unit 24. A cooking food cage 35 is provided to contain food to be cooked and the boil up and heat insulate the food.

A filter 19, for collecting pieces of food floating in the hot water, is arranged in the upper portion of the outer tank 5. Further, a conduit 37 having a water exhaust valve 38 for exhausting the water is provided in the bottom of the outer tank 5, and a conduit 39 for exhausting the overflowed hot water H is provided at the ceiling plate 7.

A secondary air guide main burner 40 and a pilot burner 41, a fizzle (half-burnt) preventive sensor 42 are provided in the combustion chamber 12. They are respectively connected through a gas cock 46 to a gas supply tube 47. A spark ignitor 43 is provided to ignite the pilot burner 41.

The operation of the cooking caldron will be described.

When the main burner 40 of the combustion chamber 12 is ignited, its flame heats the bottom surface of the inner tank 3. High temperature combustion gas thus generated is exhausted through the inner flue 13 and the outer flue 14 and the flue 16 from the exhaust cylinder 17 while the exhaust gas gradually falls in temperature. At this time, wide heating areas from the bottom surface to the sidewall of the inner tank 3, and from the inside wall to the bottom surface and outside wall of the outer tank 4 are obtained. The combustion cylinder 10 is heated to a high temperature to radiate far infrared rays from the inner and outer walls, the heat of the radiated far infrared rays is superposed on the heat of the high temperature combustion gas to heat the inner and outer tanks 3 and 4.

On the other hand, the hot water heated in the inner tank 3 is fed upwardly as an upward stream and collected by the guide partition plate 20 provided with a gradient. The hot water is then guided by the guide partition plate 20, moved to the passage 21 of the upstream side, and fed through the passage 21 into the upper boiling chamber 33.

The food is thrown in the cooking food cage 35 in the boiling chamber 33. The temperature of the hot water is lowered by the food. The hot water in the boiling chamber 33 is circulated, by a hot water stream fed subsequently into the boiling chamber 33 from the passage 21, and introduced via the through hole 31 of the partition plate 30 into the heat insulation chamber 34.

The food boiled up by the hot water in the boiling chamber 33 is transferred to the heat insulation chamber 34 together with the cooking food cage 35. The cooked food is bathed with hot water at a relatively low temperature for a predetermined period in the heat insulation chamber 34, and the cooked food is heat insulated and retains its taste.

Then, the hot water further with a lowered temperature in the heat insulation chamber 34 is moved down through the circulation unit 26, and pieces of the cooked food floating in the descending stream are collected by the filter 19. The downward moving stream introduced into the outer tank 5 is heated, circulated through the connection tube 6 to the inner tank 3, heated to the highest temperature by the combustion chamber 12, and again caused to circulate upward. The guide partition plate 20 radiates a far infrared ray caused by the hot water temperature to improve thermal efficiency.

As described above, the circulating passage of the water from the inner tank 3 through the guide partition plate 20, the passage 21, the boiling chamber 33, the heat insulation chamber 34, the circulating unit 26, the outer tank 5, the connection tube 6 to the inner tank 3 is formed, and the passage of the hot water is specified to cook or boil up the food and to heat insulate it. A number of foods to be cooked, contained in the cooking food cage 35, are continuously thrown into the boiling chamber 33 to perform cooking of a large quantity of foods.

This invention is not limited to the above description and illustrated embodiment, and various changes and modifications may be made without departing form the spirit and scope of the present invention. For example, the shape of the passage 21 may be of a square shape, a rectangular shape, etc., and the size and the number of the passages 21 may be freely optional.

What is claimed is:

1. A cooking device comprising:
   a hot water tank having a) a bottom inner tank provided in a bottom of said hot water tank and b) a bottom outer tank surrounding said bottom inner tank through a flue which surrounds the bottom inner tank;
   a combustion chamber provided under and attached to said hot water tank and in communication with said flue;
   a guide partition plate arranged at an angle in said hot water tank and having a) a passage for passing hot water upward therethrough from the bottom of hot water tank, b) a circulating unit formed at a part of said guide partition plate opposite said passage and c) a partition unit located between said passage and said circulating unit for collecting the hot water rising from the bottom of said hot water tank to guide the hot water to said passage; and
   a partition plate having a through hole and provided to partition the hot water tank above said guide partition plate into a boiling chamber, located above said passage, and a heat insulation chamber, located above said partition unit.

2. A cooking device according to claim 1, wherein said bottom inner tank is connected to said bottom outer tank via a plurality of connection tubes crossing said flue in lower portions of said flue.

3. A cooking device according to claim 1, wherein said flue surrounding said bottom inner tank is formed of an inner flue and an outer flue which is connected to said inner flue by a combustion cylinder provided between said bottom inner and outer tanks.

4. A cooking device according to claim 3, wherein said combustion cylinder is formed of ceramic capable of radiating a far infrared ray upon heating.

5. A cooking device according to claim 1, wherein said guide partition plate is formed of ceramic capable of radiating a far infrared ray upon heating.

6. A cooking device according to claim 1, wherein said passage is formed of a number of round holes.

7. A cooking device according to claim 1, wherein said circulating unit is formed of a number of round holes.

8. A cooking device according to claim 1, wherein said circulating unit is located adjacent an edge of said guide partition plate.

9. A cooking device according to claim 1, wherein a filter for collecting pieces of cooked food floating in hot water, said filter is provided in an upper portion of said bottom outer tank.

* * * * *